May 19, 1925.
G. M. SINCLAIR
GRAIN SAVING ATTACHMENT
Filed July 30, 1923
1,538,665
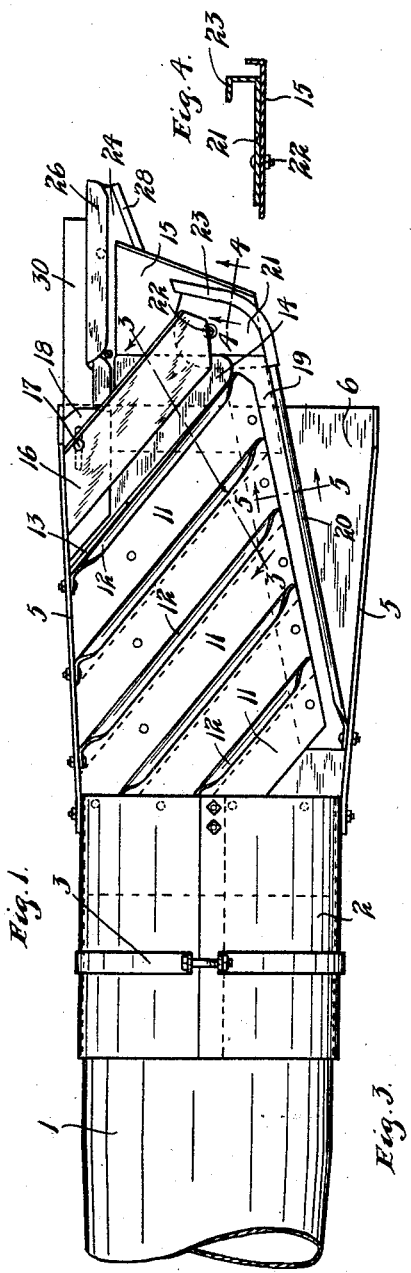
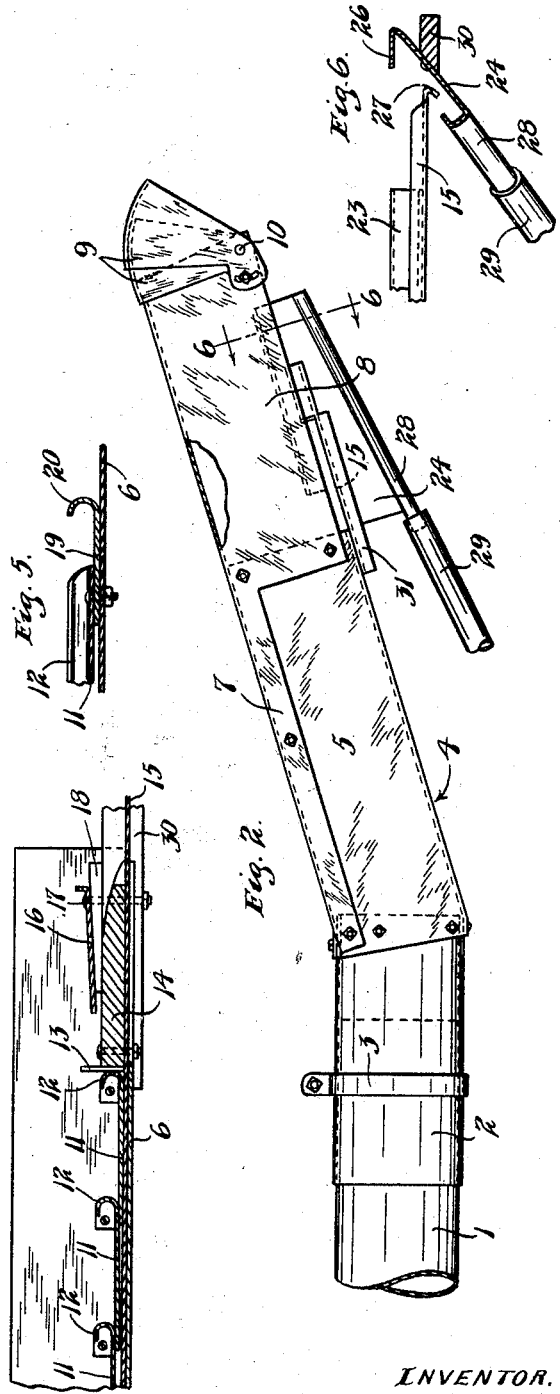
INVENTOR.
GEORGE M. SINCLAIR.
BY HIS ATTORNEY.

Patented May 19, 1925.

1,538,665

UNITED STATES PATENT OFFICE.

GEORGE M. SINCLAIR, OF TIMMER, NORTH DAKOTA.

GRAIN-SAVING ATTACHMENT.

Application filed July 30, 1923. Serial No. 654,519.

*To all whom it may concern:*

Be it known that I, GEORGE M. SINCLAIR, a citizen of the United States, residing at Timmer, in the county of Morton and State of North Dakota, have invented certain new and useful Improvements in a Grain-Saving Attachment; and I do hereby declare the following to be a full, clear, and exact description of the invention, such as will enable others skilled in the art to which it appertains to make and use the same.

This invention relates to a grain saving device or a device for separating grain from the straw and chaff and is illustrated as of the type adapted to be used with a pneumatic stacker. In the large grain growing areas of the Northwest it is impracticable to have the grain in uniformly dried condition and this results in a great deal of the grain being blown off with the straw and chaff.

It is an object of this invention to provide a simple and efficient device adapted to be attached to the discharge tube of the pneumatic stacker which will intercept and save the grain which is blown out with the straw. It is a further object of the invention to provide such a device comprising a member adapted to be attached to the end of the discharge tube of the pneumatic stacker and which has a floor with means thereon to intercept and direct the grain to a collecting means while permitting the straw to pass on out of said member.

It is more specifically an object of the invention to provide a grain saving device having such a member as above set forth, the floor extending at an angle to the axis of the discharge tube of the pneumatic stacker against which floor the grain is projected, said floor having a plurality of substantially parallel outwardly inclined baffles extending substantially across the same and having a longitudinally extending baffle or deflector plate adapted to direct the grain to another deflecting plate which receives and directs the grain to the collecting means.

These and other objects and advantages of the invention will be fully set forth in the following description made in connection with the accompanying drawings in which like reference characters refer to the same parts throughout the different views, and in which, Fig. 1 is a plan view of the device showing the same attached to the discharge tube of the pneumatic stacker and having the cover removed;

Fig. 2 is a view in side elevation of the device also showing the same attached to the pneumatic stacker;

Fig. 3 is a vertical section taken on the line 3—3 of Fig. 1, as indicated by the arrows;

Fig. 4 is a vertical section taken on the line 4—4 of Fig. 1, as indicated by the arrows;

Fig. 5 is a vertical section taken on the line 5—5 of Fig. 1, as indicated by the arrows; and Fig. 6 is a substantially vertical section taken on the line 6—6 of Fig. 2.

Referring to the drawings, the end of the discharge tube of a pneumatic stacker of common or standard type is shown as 1. A tube or conduit 2 surrounds the end of the tube 1 and is clamped thereto by the clamping band 3, the ends of which are drawn together by a headed and nutted bolt. The conduit 2 has extending outwardly therefrom and secured thereto, a bottom member 4 having side portions 5 and a floor portion 6, said floor portion increasing in width outwardly from the conduit 2. A cover member 7 is provided extending across the top of the member 4 and having portions 8 depending at each side thereof at its outer portion. To the outer end of the side portions 8 are adjustably secured segmental sections 9 movable about a connecting pivot 10 to form a curved directing hood. The member 4 as clearly shown in Fig. 2, extends at an angle to the longitudinal axis of the members 1 and 2 so that the straw, chaff and grain discharged from member 1 is blown against said floor. Said floor has secured thereto a series of baffle deflector plates 11 illustrated as being fastened to one side 5 of the member 4 and extending thereacross inclined in an outward direction, said plates terminating at a distance from the other side 5. The said plates 11 are laid substantially flat against the floor 6 and in the embodiment of the invention illustrated, are shown as being arranged in slightly over-lapping relation and secured by rivets extending through the floor 6. Each plate 11 has an upstanding and inwardly curved lip 12 at its outer edge and the ends of said plates which are spaced from the side 5 extend in a line making a slight angle to the longitudinal axis of the members 1 and 3. The outermost member 11 has an upstanding shield plate 13 upstanding along its outer edge and extending for a short distance along the length thereof from the member 5 to which the plates 11 are secured. A substantially triangular block 14 is disposed on top of the floor 6 and against the outer edge of the outermost plate 11 and the plate 13, said block being supported by the floor 6 and by an extension 15 thereof, which extension comprises a plate secured to the underside of the floor 6. The block 14 supports a flat vane or deflector plate 16, the edges of which extend substantially parallel with the sides of the plates 11. The inner side of plate 16 is disposed slightly above the top surface of the block 14, which surface is substantially in line with the top edges of the lips 12. The plate 16 is held in place by a clamping member 17 comprising a headed and nutted bolt which extends through a slot formed in a wedge member 18 extending under the plate 16 and at one side of the block 14. The wedge 18 can be set in different positions and will move the plate 16 into different planes so that its inner edge will stand at different heights. When properly set the bolt 17 is tightened to hold the parts in position. The plate 16 has a short vertically extending lip at its outer edge.

Extending along the floor 6 substantially parallel to the ends of the plate 11 is a deflector plate 19 having its outer edge upstanding and bent toward the plates 11 in the form of a curved lip 20. The outer end of the deflector plate 19 is formed as a separate piece or quadrant 21 which is movable about the headed and nutted clamping bolt 22 as a pivot, and said quadrant has an upstanding and inwardly directed lip 23 shown as of rectangular form which is continuous with the lip 20 and alines therewith. The extension 15 of the floor 6 is cut away so as to be spaced from the side of the floor to which the plates 11 are secured and a receiving deflector plate 24 extends along the edge of the extension 15, which plate 24 has an inwardly directed lip 26 at its top and has its main body portion extending downwardly transversely beneath the slightly downturned edge 27 of the extension 15. The lower edge of the plate 24 is bent upwardly and inwardly to form a channel 28 with the lower edge of which a pipe or conduit 29 is connected. The plate 24 is supported by a member 30 extending outwardly from one side of the floor 6 and secured thereto. In the embodiment of the invention illustrated, the member 30 is shown as a wooden strip, although it is obvious that the same could be in the form of a metal plate. The outer edge of the floor extension 15 is formed with a short vertically extending lip and the edge of the same remote from the plate 24 is bent downward to form a short vertically disposed lip 31 to stiffen said plate.

In operation, when the threshing machine and stacker are being operated, the straw, chaff and such grain as is mixed therewith is blown out through the stacker tube 1. This material will be projected against the floor 6 and against the baffle deflector plates 11. The grain being heavier than the straw and chaff will be inclined to drop and as the material is blown against the floor the grain will be intercepted by the lips 12. Owing to the velocity of the material and the force of the blast the grain will be moved along the plates 11 and directed by the lips 12 against the lip 20 of plate 19. The grain will be propelled outwardly along the plate 19 and the lip 20 and will be directed by the curved lip 23 across the outer end of the floor extension 15 and discharged against the plate 24. The grain will be intercepted by the plate 24 and its lip 26 and directed downwardly into the channel 28 from which it will pass into the conduit 29 and be returned to the threshing machine, or suitable collecting means. The vane or plate 16 acts to direct the straw upwardly over the lip 23 and the plate 24 as well as the extension 15, so that the same does not interfere with the grain. It is desirable that a small amount of air pass under the plate 16 to blow away any chaff which has been caught in the grain stream, and for this purpose, the inner edge of plate 16 is disposed above the surface of block 14. The plate 13 acts to shield the plate 24 from a strong blast so that there is no tendency to blow the grain out of the upper end thereof and so that the grain can move downwardly by gravity. If a slight blast of air passes upwardly along the plate 24 it will only assist in separating the chaff and dust from the grain. The point at which the grain strikes the plate 24 can be varied somewhat by adjusting the plate 21 about its pivot 22. The vertical lip at the outer side of the floor extension 15 will act to divert any grain which might drop on said extension from the straw and chaff stream.

From the above description it is seen that applicant has provided a simple and efficient device which will effectively separate the grain from the discharged straw and chaff and save the same. The device has been thoroughly demonstrated in actual practice and found to be very successful. As previously stated, in the northwestern part of this country where large areas of wheat are planted, it is often necessary to thresh the wheat when a considerable portion of the same is damp or moist. The threshing is carried on practically continuously after being started and is not interrupted to allow the grain to dry when the same has been wet by a shower or is taken in wet condition from the stack. The variation in the degree of moisture in the wheat results in an incomplete separation of the grain and the amount of grain passing out with the straw varies from 1 to 10%. The present invention saves a large amount of grain which would otherwise be lost and thus has a high degree of utility. The device can be simply made from common sheet material and forms an attachment comparatively light in weight and one which can easily and readily be attached to the standard form of pneumatic stacker. The structure of the device also enables the same to be made at comparatively small cost.

It will, of course, be understood, that various changes may be made in the form, details, arrangement and proportions of the parts without departing from the scope of applicant's invention, which, generally stated, consists in a device capable of carrying out the objects above stated and such as shown and described and set forth in the appended claims.

What is claimed is:

1. A grain saving device comprising a conduit adapted to be attached in communication with a discharge tube of a pneumatic stacker, said conduit having a floor inclined upwardly at an angle to the axis of said tube and against which the discharged material is projected, a plurality of baffle deflecting means extending diagonally across said floor adapted to intercept and direct the grain to one side thereof, and grain directing and collecting means co-operating therewith.

2. The structure set forth in claim 1, and means inclined at an angle to said floor for directing the straw and chaff over the outer end of said last two mentioned means.

3. A grain saving device comprising a conduit, means for attaching the same to the discharge tube of a pneumatic stacker, said conduit having a flat bottom inclined upwardly at an angle to the axis of said tube against which the straw, chaff and grain are projected, a plurality of baffle deflectors extending obliquely across said bottom to intercept and direct the grain to one side thereof, a baffle deflector extending substantially longitudinally of said floor adjacent the ends of said baffle deflectors to receive the grain therefrom and directing and collecting means co-operating therewith.

4. A grain saving device comprising a conduit, means for attaching the same to the discharge tube of a pneumatic stacker, said conduit having a flat bottom inclined upwardly at an angle to the axis of said tube against which the straw, chaff and grain are projected, a plurality of baffle deflectors extending obliquely across said bottom to intercept and direct the grain, a baffle deflector extending substantially longitudinally of said floor adjacent the ends of said baffle deflector to receive the grain therefrom, a deflecting and receiving plate to which the grain is directed from said last mentioned baffle deflector, and a flat vane beyond the outermost one of said baffle deflectors inclined upwardly relative to said bottom to direct the straw over said last mentioned baffle deflector and receiving plate.

5. The structure set forth in claim 4, and means for varying the angle of said vane with said floor.

6. The structure set forth in claim 3, and a vertically disposed shield extending along the outer side of the outermost of said first mentioned baffle deflectors a short distance from one end thereof.

7. The structure set forth in claim 4, said last mentioned baffle deflector having its outer side curved around the end of said vane and adapted to direct the grain across said bottom.

8. The structure set forth in claim 4, said last mentioned baffle deflector having its outer side curved around the end of said vane and adapted to direct the grain across said bottom, said outer side being pivoted and adjustable about said pivot.

9. A grain receiving device comprising a conduit adapted to be connected to the discharge tube of a pneumatic stacker, said conduit having a flat floor inclined at an angle to the axis of said tube and increasing in width outwardly, against which floor the material is projected, a series of substantially parallel baffle deflectors extending from one side of said floor transversely thereacross in an outwardly inclined direction and being spaced from the other side of said floor and adapted to intercept and direct the grain, and a baffle deflector extending substantially longitudinally of said floor adjacent the ends of said baffle deflectors adapted to receive the grain therefrom and direct the same outwardly, and a receiving and discharge plate against which the grain is directed by said last mentioned baffle deflector.

10. The structure set forth in claim 9, said floor being cut away at one side at its outer end and said receiving and discharge plate extending downwardly transversely under said side and having an inwardly extending lip at its upper side.

11. A grain saving device adapted to be attached to the discharge tube of a pneumatic stacker comprising a conduit having a floor inclined at an angle to the axis of said tube against which the material is projected, a plurality of substantially parallel baffle deflector plates secured substantially flat against said floor and extending outwardly transversely thereof, each of said plates having an upwardly and rearwardly turned lip at its outer side, a deflector plate extending substantially longitudinally of said floor adjacent the ends of said plates and having an upwardly and inwardly turned lip at its outer side and being adapted to receive the grain from said plates, said latter plate having its lip curved at its outer end to direct the grain across said floor, and a plate extending downwardly transversely beneath said floor and having an inturned lip extending above said floor adapted to receive the grain from said last mentioned plate.

12. A grain saving attachment for a pneumatic stacker comprising a conduit having a floor increasing in width outwardly and having a series of baffle deflector plates extending transversely thereof and outwardly from one side of said floor, said plates being spaced from the other side of said floor and having grain collecting means extending therealong, a grain collecting plate extending outwardly in said floor and spaced from the ends of said baffle deflector plates, said plate also having grain collecting means extending therealong, and a grain collecting and discharge member to which said last mentioned plate delivers.

13. The structure set forth in claim 11, the outer ends of said first mentioned deflector plates extending in a line making a slight angle with the longitudinal center line of said floor, and said second mentioned plate extending substantially parallel to said line.

In testimony whereof I affix my signature.

GEORGE M. SINCLAIR.